(12) United States Patent
Sanaullah et al.

(10) Patent No.: US 9,098,737 B2
(45) Date of Patent: Aug. 4, 2015

(54) EFFICIENT 360 DEGREE VIDEO PROCESSING

(71) Applicants: Abu Shaher Sanaullah, Austin, TX (US); Claude Lano Cox, Austin, TX (US); Richard William Schuckle, Austin, TX (US); Rocco Ancona, Austin, TX (US); Roy W. Stedman, Austin, TX (US); Dongyang Zhang, Austin, TX (US)

(72) Inventors: Abu Shaher Sanaullah, Austin, TX (US); Claude Lano Cox, Austin, TX (US); Richard William Schuckle, Austin, TX (US); Rocco Ancona, Austin, TX (US); Roy W. Stedman, Austin, TX (US); Dongyang Zhang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 13/795,137

(22) Filed: Mar. 12, 2013

(65) Prior Publication Data

US 2014/0270343 A1 Sep. 18, 2014

(51) Int. Cl.
G06K 9/00 (2006.01)
(52) U.S. Cl.
CPC ........ G06K 9/00302 (2013.01); G06K 9/00261 (2013.01)
(58) Field of Classification Search
CPC .......... G06K 9/00221; G06K 9/00261; G06K 9/00765; G06K 2009/4695; H04N 5/144; G06T 7/0038; G06T 7/0081; G06T 7/0097; G06T 7/2006; G06T 7/2026; G06T 2207/10016; G06T 2207/20021; G06T 2207/30201
See application file for complete search history.

(56) References Cited

U.S. PATENT DOCUMENTS

| | | | |
|---|---|---|---|
| 7,130,446 B2 | 10/2006 | Rui et al. | 382/103 |
| 7,151,843 B2 | 12/2006 | Rui et al. | 382/103 |
| 7,171,025 B2 | 1/2007 | Rui et al. | 382/103 |
| 7,428,315 B2 | 9/2008 | Rui et al. | 382/103 |
| 7,433,495 B2 | 10/2008 | Rui et al. | 382/103 |
| 2007/0183663 A1* | 8/2007 | Wang et al. | 382/173 |
| 2008/0019661 A1* | 1/2008 | Obrador et al. | 386/52 |
| 2012/0069897 A1* | 3/2012 | Anselmo et al. | 375/240.03 |
| 2012/0314015 A1 | 12/2012 | Watson et al. | 348/14.1 |
| 2013/0022243 A1* | 1/2013 | Xu et al. | 382/103 |

* cited by examiner

Primary Examiner — Andrew W Johns
(74) Attorney, Agent, or Firm — Baker Botts L.L.P.

(57) ABSTRACT

In accordance with the present disclosure, systems and method for efficient 360 degree video processing are described herein. A first image within a first frame of a video stream may be detected. The first frame may be partitioned into a first portion containing the first image and a second portion. An attempt may be made to detect the first image within a third portion of a subsequent frame that corresponds to the first portion of the first frame, and an attempt may not be made to detect a second image within a fourth portion of the subsequent frame that corresponds to the second portion of the first frame. Additionally, an attempt may be made to detect the second image within a fifth portion of at least one other subsequent frame that corresponds to the second portion of the first frame.

19 Claims, 5 Drawing Sheets

EFFICIENT 360 DEGREE VIDEO PROCESSING

TECHNICAL FIELD

The present disclosure relates generally to the operation of computer systems and information handling systems, and, more particularly, to efficient 360 degree video processing.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Video and image processing have been increasing in importance in a variety of fields, including security, video conferencing, etc. At the same time, video capture devices have increased in sophistication, strength, and robustness, leading to a larger data processing load. Video processing in particular may be computationally intense when dealing with high-resolution, high frame rate video. This may lead to lag times when processing video streams, which can be problematic if the video processing application is security related. The computational intensity of certain video processing applications also may outpace the capabilities of typical computing systems such that larger, specialized systems are required.

SUMMARY

In accordance with the present disclosure, systems and method for efficient 360 degree video processing are described herein. A first image within a first frame of a video stream may be detected. The first frame may be partitioned into a first portion containing the first image and a second portion. An attempt may be made to detect the first image within a third portion of a subsequent frame that corresponds to the first portion of the first frame, and an attempt may not be made to detect a second image within a fourth portion of the subsequent frame that corresponds to the second portion of the first frame. Additionally, an attempt may be made to detect the second image within a fifth portion of at least one other subsequent frame that corresponds to the second portion of the first frame.

The systems and methods disclosed herein may be technically advantageous by allowing for efficient processing by identifying certain areas of interest in a video stream and partitioning the frames of the video stream based on the identified areas of interest. The areas of interest can be processed more frequently, leaving certain areas to be processed less frequently. This may reduce the computational load on a frame by frame basis while still allowing for objects of interest to be identified and tracked as needed. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
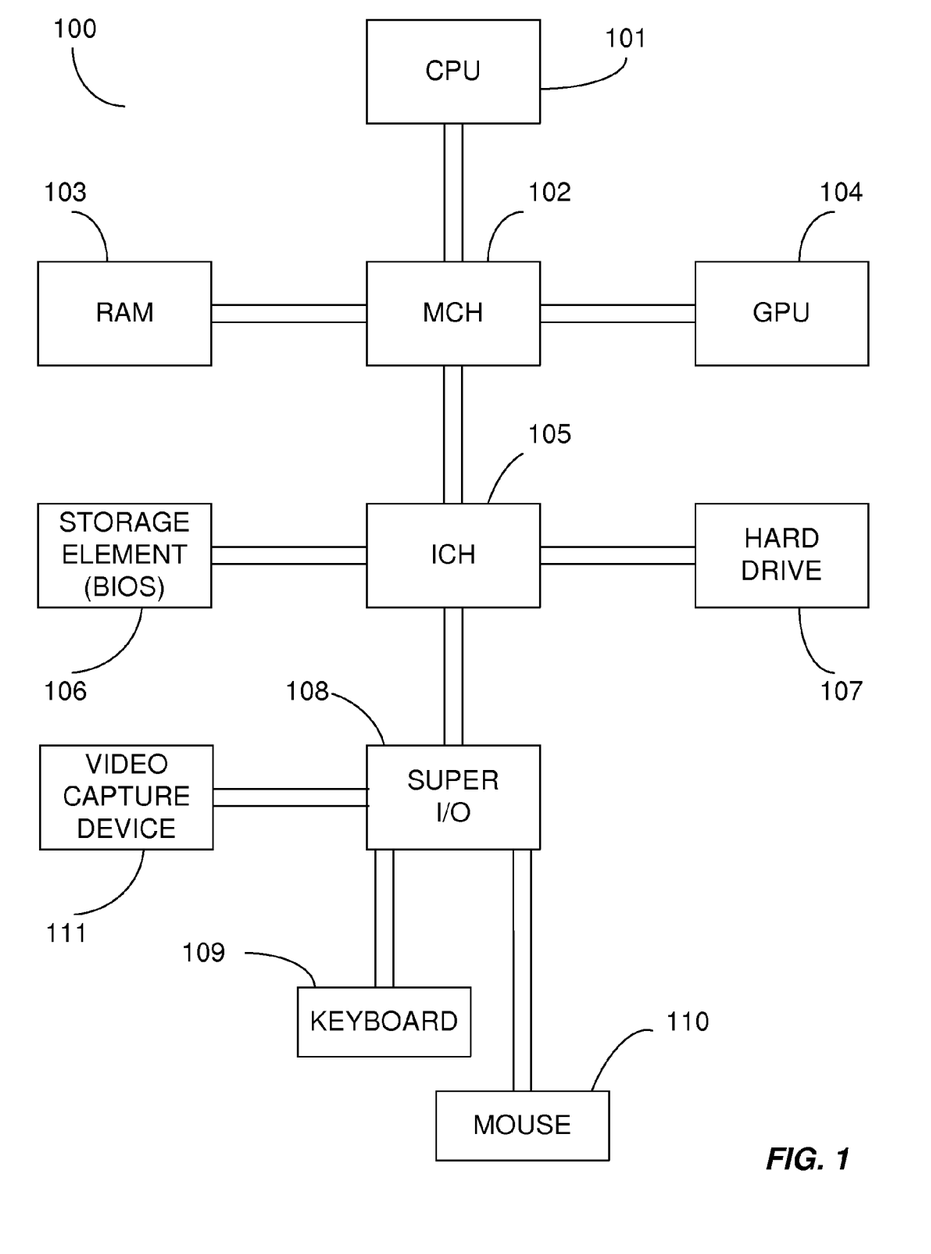
FIG. 1 is a block diagram of an example information handling system, according to aspects of the present disclosure.

Shown in FIG. 1 is a block diagram of an example information handling system 100. A processor or CPU 101 of the information handling system 100 is communicatively coupled to a memory controller hub or north bridge 102. Memory controller hub 102 may include a memory controller for directing information to or from various system memory components within the information handling system, such as RAM 103, storage element 106, and hard drive 107. The memory controller hub 102 may be coupled to RAM 103 and a graphics processing unit 104. Memory controller hub 102 may also be coupled to an I/O controller hub or south bridge 105. I/O hub 105 is coupled to storage elements of the computer system, including a storage element 106, which may comprise a flash ROM that includes a basic input/output system (BIOS) of the computer system. I/O hub 105 is also coupled to the hard drive 107 of the computer system. I/O hub 105 may also be coupled to a Super I/O chip 108, which is itself coupled to several of the I/O ports of the computer system, including keyboard 109 and mouse 110.

The Super I/O chip may also be connected to and receive input from a video capture device 111. The video capture device 111 may comprise a variety of video or image capture devices, including a 360-degree camera. A 360-degree camera may capture an image or a video of the area surrounding the camera. As will be appreciated by one of ordinary skill in the art in view of this disclosure, a video may comprise a plurality of still images or frames taken sequentially, with the number of still images taken in a given period of time being referred to as the frame rate of the video.

According to aspects of the present disclosure, systems and method for efficient 360 degree video processing are described herein. One video processing application is face recognition and face detection for security and video conferencing purposes. Detecting faces and tracking their movement within a video stream can require the use of computationally intensive algorithms that run on each frame of the video stream. This can be problematic with 360-degree cameras because the frame size is large and each frame takes more compute cycles to process. As will be discussed below, the systems and methods described herein may reduce the computational intensity of certain 360 degree video processing applications by optimally decreasing the amount of data that must be processed from any given frame. Although the remainder of this disclosure will be directed to those applications, it is not limited to them.

FIGS. 2A-D are diagrams that graphically illustrate an example video processing application, according to aspects of the present disclosure. As will be described herein, the graphical representations may correspond to frames from a video stream, and may graphically illustrate certain processing steps on the frames. The frames may come, for example, from a video stream received at an information handling system, such as a video stream from a 360 degree camera coupled to an information handling system.

Figure 2A:
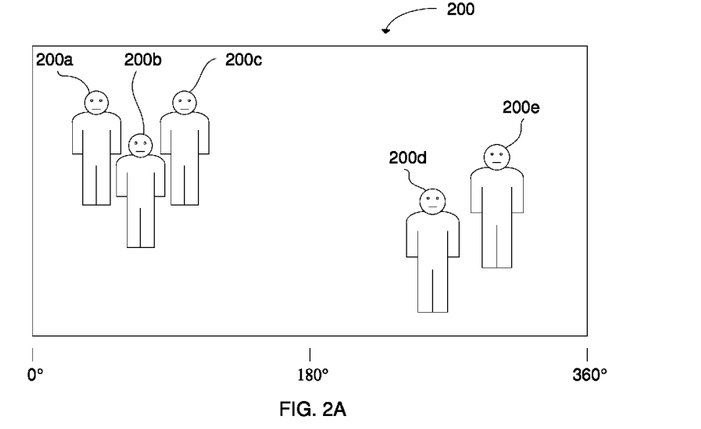
FIGS. 2A-2D are diagrams of an example expandable diameter stylus, according to aspects of the present disclosure.

FIG. 2A illustrates an example image or frame 200 taken from a 360-degree camera. The image 200 is an idealized version of a 360-degree image, as typical images taken by 360-degree cameras produce a "fisheye" image that is warped due to the circular nature of the lenses and the geometry of the image capture electronics. As will be appreciated by one of ordinary skill in the art in view of this disclosure, de-warping algorithms may be used to "flatten" the fisheye image to produce an image similar to those one shown in FIGS. 2A-2D. A video taken by a 360-degree camera may comprise hundreds and thousands of frames similar to image 200, depending on the frame rate and the duration of the video. In certain instances, a video capture device may be used to monitor rooms or environments, in which case a video stream with an undefined number of still images will be produced and transmitted to an attached information handling system. Processing that video stream for objects of interest can be computationally intensive, and in some cases may outpace the operation capacity of the attached information handling system.

The frame 200 may be the first frame of a video stream received at an information handling system. The frame 200 is referred to as the first frame for explanatory purposes and can but is not required to be the initial frame generated in a video stream. The video stream may comprise a plurality of sequential frames from a 360 degree camera in communication with the information handling system. The information handling system may comprise a processor and a storage medium coupled to the processor, and may have a similar configuration to the information handling system described with respect to FIG. 1. Receiving a video stream at a processor may comprise receiving at least a first frame of the video stream at a processor of the information handling system.

Once received at the information handling system, each image of interest within the first frame 200 may be detected. In the embodiment shown, the images of interest comprise faces, and at least one face within the first frame 200 may be detected. Frame 200 includes faces 200a-e, located throughout the frame 200. Each of the faces 200a-e may be detected. In certain embodiments, detecting the first image may comprise executing a face detection algorithm using the processor of the information handling system. A face detection algorithm may be an algorithm that determines the locations of human faces within an arbitrary image. As will be appreciated by one of ordinary skill in the art, a face detection algorithm may be stored in the storage medium of the information handling system as a set on instructions executed by the processor.

One example face detection algorithm is a binary-classification system with a sliding window. Specifically, the face detection algorithm may comprise a classifier that is trained or programmed to identify the spatial characteristics of certain features within an image. For example, the classifier may be trained or programmed to identify the spatial relationship between certain features of a human face, e.g., eyes, ears, nose, to identify an unknown object as either a human face or not a human face. The classifier may run in conjunction with a sliding window, which isolates a portion of the frame in which the classifier may identify a face. The sliding window may be run iteratively, both vertically and horizontally across the frame until the entire frame has been processed for the presence of a human face. Other face detection algorithms are possible, as would be appreciated by one of ordinary skill in the art in view of this disclosure.

In certain embodiments, data structures may be created for each of the detected faces 200a-e, and may be used to store the locations of the faces within the frame as well as certain characteristics of the face. One example characteristics that may be stored in the data structure is the identity of the person whose face was detected. In certain embodiments, each detected face 200a-e may be identified—a step that may be skipped, for example, when the identities of the persons within a video stream are not required. In certain embodiments, identifying an image may comprise running a face recognition algorithm within the information handling system, either alone or in combination with a face detection algorithm. For example, once the faces 200a-e are detected, each may be isolated, and the geometrical features of the faces 200a-e may be extracted. These geometrical features may include, for example, the relative position, size, and/or shape of the eyes, nose, cheekbones, and jaw. Once extracted, the geometrical features may be compared against a database in communication within the information handling system. The database may be pre-populated with the identities of known individuals as well as their previously extracted geometrical facial features. By comparing the extracted geometrical features of the image against the database, the identity of the person whose face was detected may be determined.

Figure 2B:
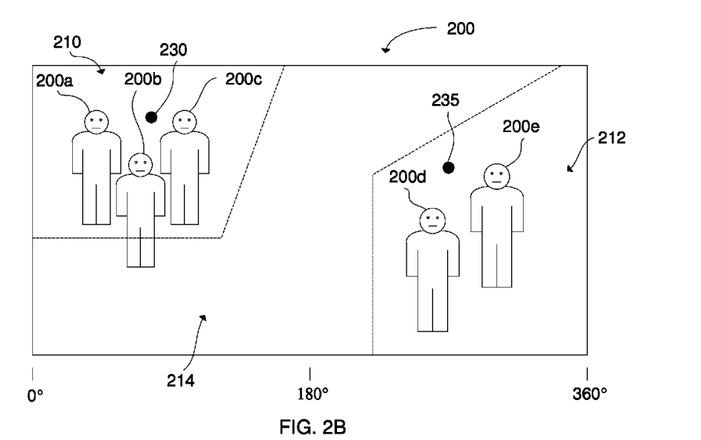

In certain embodiments, as can be seen in FIG. 2B, the frame 200 may be partitioned into at least one portion that contains a first image or face and at least one portion that do not contain a face. Frame 200, for example, includes portions 210 and 212, which contain faces 200a-e, and portion 214, which does not contain a face. As will be appreciated by one of ordinary skill in the art in view of this disclosure, a 360 degree camera may be positioned in a location with multiple people, and a video stream generated by the camera may include multiple faces. In certain embodiments, partitioning frame 200 into portions containing faces and portions without a face may comprise grouping the detected faces 200a-e and determining the location of certain portions based on the locations of the groupings. In the embodiment shown, faces 200a-c have been grouped together and placed in one portion 210, and faces 200d-e have been grouped together and placed in another portion 212. Notably, by partitioning each frame into at least one portion that contains faces, and at least one portion that does not, subsequent face tracking and detection algorithms may be simplified or limited in scope.

In certain embodiments, grouping the detected faces 200a-e may comprise executing a k-means geometrical clustering algorithm using a processor. One example k-means geometrical clustering algorithm may include selecting an arbitrary number of mean locations at arbitrary positions within the first frame 200. Mean locations may be locations within the first frame from which the distances of each of the detected faces may be determined. The distances from each mean location to each detected face may be determined, and each of the detected faces may be "clustered" or associated with the closest mean location. The mean locations may then be altered to reduce the average distance from the detected faces to the mean locations. This may include associating a detected face with a different mean location if the mean locations are moved such that the closest mean location is different from the one originally associated with the detected face. After numerous iterations, the mean locations and clusters may be set, with each of the clusters being included in a separate partition. The mean locations are illustrated as points 230 and 235 in FIG. 2B. The remaining space within the frame without detected faces may form one portion 214 or multiple portions.

The portions 210-214 determined within the frame 200 may be applied to at least some of the subsequent frames of the video stream. Depending on the frame rate of a video stream, the detected faces 200a-e within a video stream may move very little from frame to frame. Additionally, it may be many frames until new images or faces appear in the video stream. As such, initially partitioning the frames of a video stream into at least one portion that includes detected faces and at least one portion that does not contain a detected face may reduce the computational load for processing each frame.

Figure 2C:
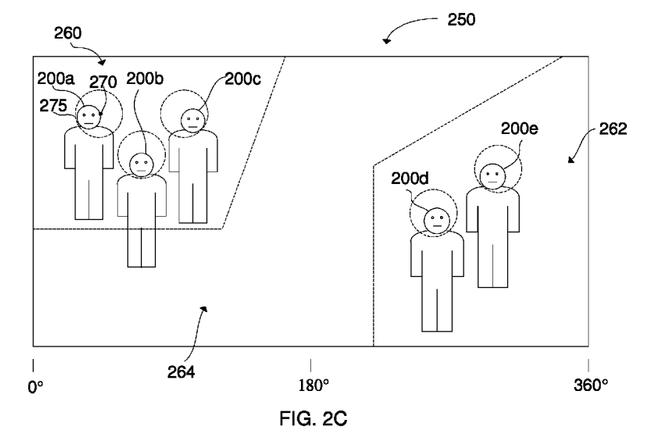

FIG. 2C illustrates an example subsequent frame 250 from the same video stream as frame 200. The frame 250 comprises portions 260, 262, and 264, which correspond to portions 210, 212, and 214, respectively. Rather than attempting to detect faces throughout the entire frame 250, as was done in frame 200, a face detection algorithm can be run only on portions 260 and 264 that were previously determined to contain detected faces 200a-e. The portion 264 of frame 250 can be excluded from processing, as it was determined previously that it did not contain a detected face.

In certain embodiments, attempting to detect faces within portions 260 and 262 may comprise executing the face detection algorithm on all of portions 260 and 262 or a subset of portions 260 and 262. Executing the face detection algorithm on a subset of portions 260 and 262 may reduce the computational load of frame 250 even further. For example, detected face 200a may be centered at a first location in frame 200, which may correspond to location 270 in frame 250. In certain embodiments, the face detection algorithm may only be run within a pre-determined pixel range 275 of the location 270. Because a detected face 200a is likely to move very little between frames, defining a pixel range in which to track detected faces may reduce the computation load even further. Each detected face 200a-200e may have a similar search range. Moreover, the location of each detected face 200a-e may be updated after each frame is processed, such that the search area will be updated for subsequent frames.

Figure 2D:
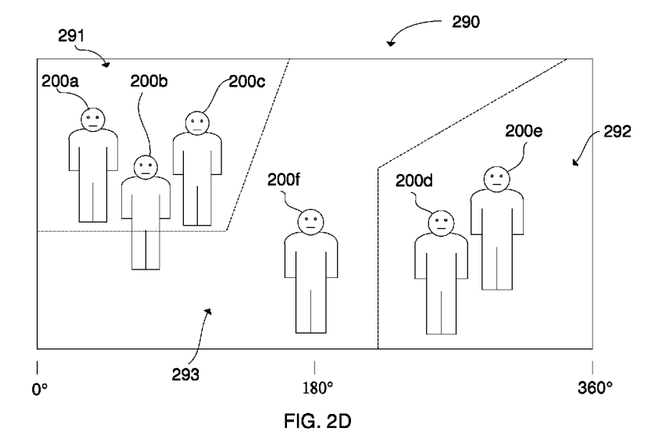

FIG. 2D illustrates another example subsequent frame 290, which may come after frames 200 and 250 in the video stream. The frame 290 comprises portions 291, 292, and 293, which respectively correspond to portions 260, 262, and 264 as well as portions 210, 212, and 214. As can be seen, a person has appeared within portion 293 after frame 250 was captured. A face detection algorithm, for example, may be run in frame 290 to attempt to detect face 200f in portion 293. Notably, portion 293 and corresponding portions in other frames may only be checked periodically. The period when the portion 293 is checked for faces may correspond to a pre-determined frame period, which may be set according to the specific video processing application. This may reduce the frame-by-frame processing load, while providing flexibility to optimize the frame period such that new faces are detected soon after they enter the frame. For example, in a high traffic area for security purposes, it may be useful to check more frequently so as to not miss a new object, whereas in video conference applications, with less variation in movements and participants, the search may be less frequent.

Figure 3:
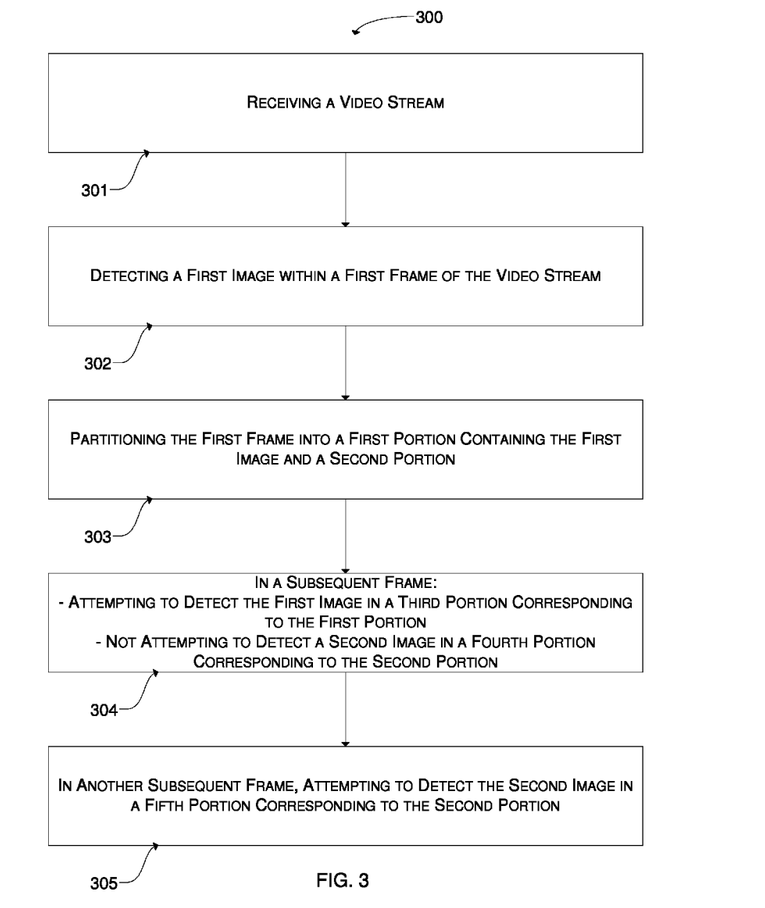
FIG. 3 is a diagram of an example method, according to aspects of the present disclosure.

FIG. 3 is a diagram of an example method 300, according to aspects of the present disclosure. As will be appreciated by one of ordinary skill in the art in view of this disclosure, the steps of the method 300 may be implemented within an information handling system as a set of instruction stored within a memory device of the information handling system. Step 301 may comprise receiving at an information handling system the video stream, wherein the information handling system comprises a processor and a storage medium coupled to the processor. The video stream may comprise a video stream form a 360 degree camera coupled to the information handling system.

Step 302 may comprise detecting a first image within a first frame of the video stream. The first frame may comprise a frame similar to frame 200 and the first image may comprise at least one face, such as faces 200a-e from FIG. 2. In certain embodiments, the first frame may be the first frame of the video stream, or may be a frame taken at a later time. Using the first frame of the video stream may allow the processing algorithm to be initialized such that processing is completed efficiently throughout the video stream. The first image may be detected using a face detection algorithm similar to the one described above.

In certain embodiments, the detected face may be identified by extracting geometrical features from the detected face and comparing the extracted features to a database in communication with the processor. This may be optional, for example, and used for security applications. In certain embodiments, the identity of the detected face may be stored within a data structure that also identifies the location of the detected face within the video stream.

Step 303 may comprise partitioning the first frame into a first portion containing the first image and a second portion. Partitioning the first frame may comprise grouping the first image with at least one other detected image. Grouping the images may include executing a k-means geometrical clustering algorithm. As is described above, the portions may be assigned such that at least one portion contains a detected image or face and at least one portion does not contain a detected image or face. This may reduce the frame-by-frame processing requirements.

Step 304 may comprise in at least one subsequent frame of the video stream, attempting to detect the first image within a third portion of the at least one subsequent frame that corresponds to the first portion of the first frame, and not attempting to detect a second image within a fourth portion of the at least one subsequent frame that corresponds to the second portion of the first frame. As described above, the portions determined in step 301 may be applied to subsequent frames such that some or all of the subsequent frames have a portion that was initially determined to have a detected image or face and a portion that was not initially determined to have a detected image or face. When processing the subsequent frames, some of the portions may be ignored or only processed periodically.

In certain embodiments, attempting to detect the first image within the third portion may comprise executing a face detection algorithm on a subset of the third portion. For example, the first image may be positioned at a first location within the first image, and the first location may correspond to a second location within the subsequent frame. The face detection algorithm may be run within a certain pixel range of the second location to further reduce the processing requirements of the video processing application.

Step 305 may comprise in at least one other subsequent frame, attempting to detect the second image within a fifth portion of the at least one other subsequent frame that corresponds to the second portion of the first frame.

The method may further include altering at least one of the first portion and the second portion based, at least in part, on the location of the first image within at least one subsequent frame. As a detected face moves, it may near a boundary between portions. In such instances, the boundary may be changed to accommodate the movement and the updated boundary may be used for subsequent frames. If the detected face moves further than a threshold value from a mean location, for example, it may move to a different portion of the frame, which may then be checked on a regular basis for movement of the face. Likewise, if a detected face within a portion leaves, such that there is no longer a detected face within that frame, the frame may not longer be regularly checked for faces, and may instead only be searched for new faces on a periodic basis, as described above.

Figure 4:
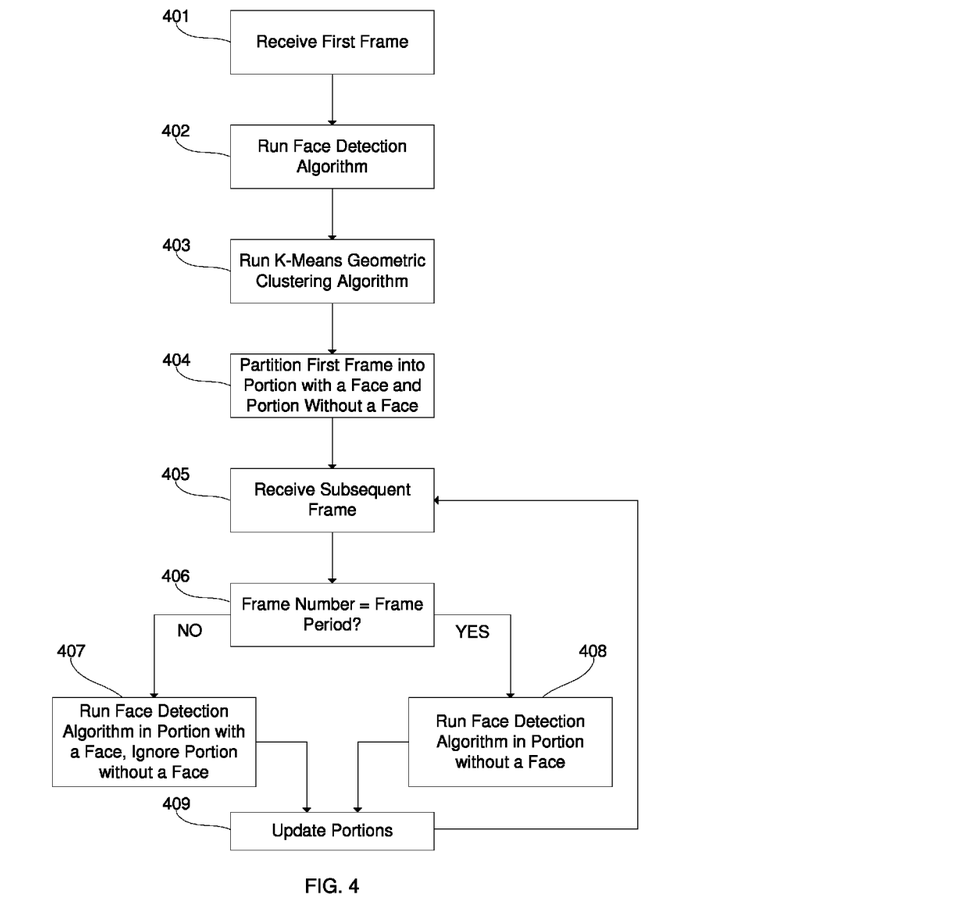
FIG. 4 is a diagram of an example method, according to aspects of the present disclosure.

FIG. 4 is a diagram of an example method, according to aspects of the present disclosure. Step 401 may comprise receiving a first frame of a video stream at an information handling system. At step 402, a face detection algorithm may be run on the entire first frame. The face detection algorithm may be similar to the algorithm described above. Each detected face within the first frame may be identified based on its current location. At step 403, a k-means geometrical clustering algorithm may be run on the locations of the detected faces within the first frame. At step 404, using the results of step 403, the first frame may be partitioned into at least one portion containing a detected face and at least one portion without a detected face.

Step 405 may include receiving a subsequent frame from the video stream. A frame number for the frame may be determined and compared with a frame period at step 406. The frame period may correspond to the frequency with which the at least one portion without a detected face is processed. At step 407, if the frame number does not correspond to the frame period, a face detection algorithm may be run on the at least one portion containing a detected face, and the at least one portion without a detected face may be ignored. The face detection algorithm in step 407 may comprise a face tracking algorithm in which the face detection algorithm is executed within a pixel range surrounding the location of detected faces in a previous frame.

At step 408, if the frame number does correspond to the frame period, a face detection algorithm may be run on the at least one portion without a detected face. The face detection algorithm may also be run on the at least one portion containing a detected face. After steps 407 or 408, the portions may be updated. For example, if a detected face has moved, the portions may be altered. Likewise if a new face has appeared in a portion that previously did not contain a detected face, that portion can be flagged as including a detected face and subsequently processed in step 407. After step 409, the process may return to step 405, when the processing may continue indefinitely until the video stream ceases.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Although the present disclosure has been described in detail, it should be understood that various changes, substitutions, and alterations can be made hereto without departing from the spirit and the scope of the invention as defined by the appended claims. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for efficient processing of a video stream with a plurality of frames, comprising:
receiving at an information handling system the video stream, wherein the information handling system comprises a processor and a storage medium coupled to the processor;

detecting a first image within a first frame of the video stream;

partitioning the first frame into a first portion containing the first image and a second portion;

in at least one subsequent frame of the video stream
attempting to detect the first image within a third portion of the at least one subsequent frame that corresponds to the first portion of the first frame;
not attempting to detect a second image within a fourth portion of the at least one subsequent frame that corresponds to the second portion of the first frame; and in at least one other subsequent frame
attempting to detect the second image within a fifth portion of the at least one other subsequent frame that corresponds to the second portion of the first frame.

2. The method of claim 1, wherein the first image comprises a first face.

3. The method of claim 2, further comprising identifying the first face, wherein identifying the first face comprises comparing geometrical features of the first face with features stored in a database in communication with the processor.

4. The method of claim 1, wherein partitioning the first frame into the first portion containing the first image and the second portion comprises grouping the first image with at least one other detected image.

5. The method of claim 4, wherein grouping the first image with at least one other detected image comprises executing a k-means geometrical clustering algorithm using the processor.

6. The method of claim 1, wherein detecting the first image within the first frame of the video stream comprises executing a face detection algorithm using the processor.

7. The method of claim 6, wherein attempting to detect the first image within the third portion of the at least one subsequent frame comprises executing the face detection algorithm on a subset of the third portion.

8. The method of claim 7, wherein
the first image is positioned at a first location with the first image;
a second location in the at least one subsequent frame corresponds to the first location in the first frame; and
the subset of the third portion comprises a pixel range surrounding the second location.

9. The method of claim 1, further comprising altering at least one of the first portion and the second portion based, at least in part, on the location of the first image within at least one subsequent frame.

10. A non-transitory, computer readable medium containing a set of instructions that, when executed by a processor of an information handling system, cause the processor to:
receive a video stream;
detect a first image within a first frame of the video stream;
partition the first frame into a first portion containing the first image and a second portion;
in at least one subsequent frame of the video stream
attempt to detect the first image within a third portion of the at least one subsequent frame that corresponds to the first portion of the first frame;
not attempt to detect a second image within a fourth portion of the at least one subsequent frame that corresponds to the second portion of the first frame; and
in at least one other subsequent frame
attempt to detect the second image within a fifth portion of the at least one other subsequent frame that corresponds to the second portion of the first frame.

11. The non-transitory, computer readable medium of claim 10, wherein the first image comprises a first face.

12. The non-transitory, computer readable medium of claim 11, wherein the set of instructions further cause the processor to compare geometrical features of the first face with features stored in a database in communication with the processor to identify the first face.

13. The non-transitory, computer readable medium of claim 10, wherein the set of instructions further cause the processor to group the first image with at least one other detected image to partition the first frame into the first portion containing the first image and the second portion.

14. The non-transitory, computer readable medium of claim 13, wherein the set of instructions further cause the processor to execute a k-means geometrical clustering algorithm using the processor to group the first image with the at least one other detected image.

15. The non-transitory, computer readable medium of claim 10, wherein the set of instructions further cause the processor to execute a face detection algorithm using the processor to detect the first image within the first frame of the video stream.

16. The non-transitory, computer readable medium of claim 15, wherein the set of instructions further cause the processor to execute the face detection algorithm on a subset of the third portion to detect the first image within the third portion of the at least one subsequent frame.

17. The non-transitory, computer readable medium of claim 16, wherein the first image is positioned at a first location with the first image;
a second location in the at least one subsequent frame corresponds to the first location in the first frame; and
the subset of the third portion comprises a pixel range surrounding the second location.

18. An information handling system, comprising:
a processor;
memory coupled to the processor, wherein the memory contains a set of instructions that, when executed by the processor, cause the processor to:
receive a video stream;
detect a first image within a first frame of the video stream;
partition the first frame into a first portion containing the first image and a second portion;
in at least one subsequent frame of the video stream
attempt to detect the first image within a third portion of the at least one subsequent frame that corresponds to the first portion of the first frame;
not attempt to detect a second image within a fourth portion of the at least one subsequent frame that corresponds to the second portion of the first frame; and
in at least one other subsequent frame
attempt to detect the second image within a fifth portion of the at least one other subsequent frame that corresponds to the second portion of the first frame.

19. The information handling system of claim 18, wherein the set of instructions further cause the processor to
group the first image with at least one other detected image to partition the first frame into the first portion containing the first image and the second portion;
execute a k-means geometrical clustering algorithm using the processor to group the first image with the at least one other detected image; and
execute a face detection algorithm using the processor to detect the first image within the first flame of the video stream.

* * * * *